No. 661,893. Patented Nov. 13, 1900.
W. W. PILKINGTON.
MACHINERY FOR ROLLING SHEETS OF GLASS.
(Application filed Aug. 22, 1899.)

(No Model.) 2 Sheets—Sheet 1.

Witnesses
John Harold Dickinson
James Barron

Inventor
William Windle Pilkington

No. 661,893. Patented Nov. 13, 1900.
W. W. PILKINGTON.
MACHINERY FOR ROLLING SHEETS OF GLASS.
(Application filed Aug. 22, 1899.)
(No Model.)
2 Sheets—Sheet 2.

Witnesses
John Harold Dickinson
James Barron

Inventor
William Windle Pilkington

UNITED STATES PATENT OFFICE.

WILLIAM WINDLE PILKINGTON, OF ST. HELEN'S, ENGLAND.

MACHINERY FOR ROLLING SHEETS OF GLASS.

SPECIFICATION forming part of Letters Patent No. 661,893, dated November 13, 1900.

Application filed August 22, 1899. Serial No. 728,085. (No model.)

*To all whom it may concern:*

Be it known that I, WILLIAM WINDLE PILKINGTON, a subject of the Queen of Great Britain, residing at St. Helen's, in the county of Lancaster, England, have invented a new and useful Improvement in and Connected with Machinery for Rolling Sheets of Glass, of which the following is a specification, reference being had to the accompanying drawings, in which—

Figure 1:
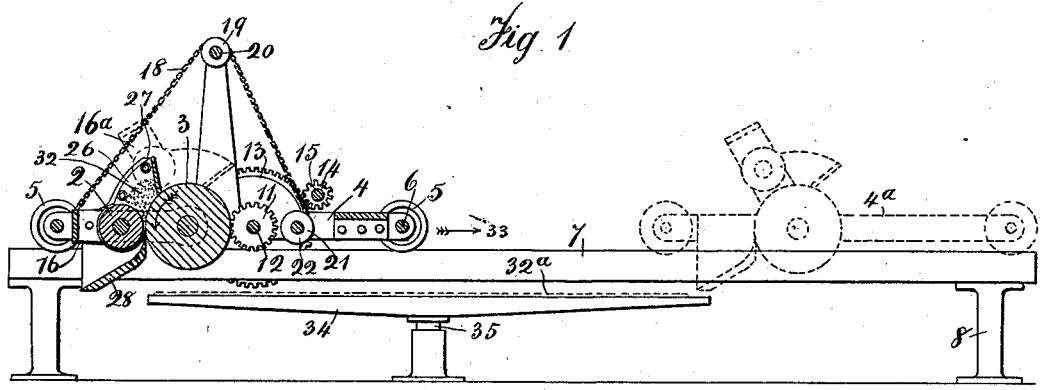
Figure 2:
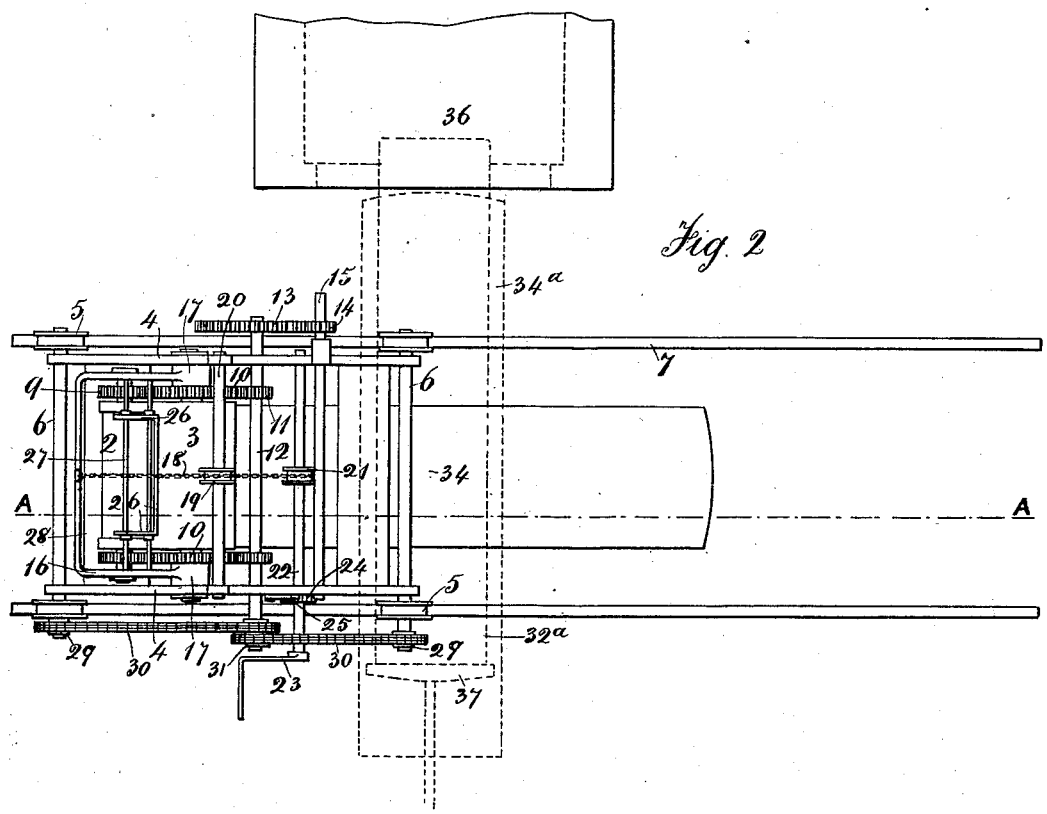
Figure 3:
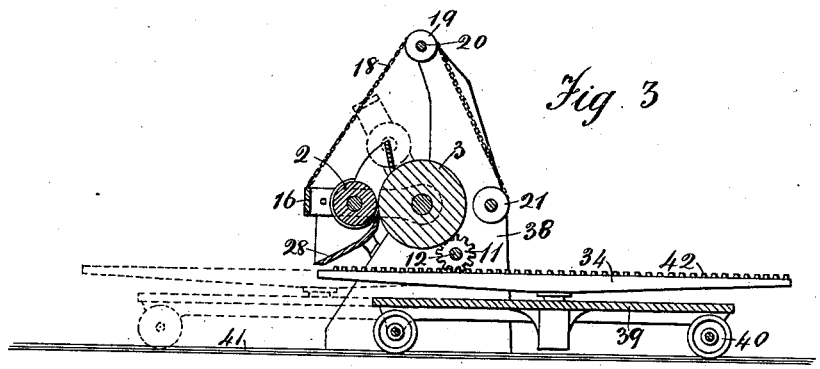
Figure 4:
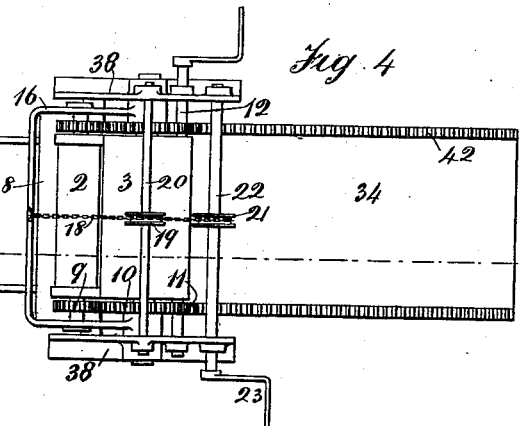

Figure 1 is a longitudinal section on the line A A on Fig. 2 of apparatus according to my invention, and Fig. 2 is a plan of the same. Fig. 3 is a longitudinal section on the line B B on Fig. 4 of a modification in which the receiving-table is movable. Fig. 4 is a plan of the same.

Hitherto in rolling patterned glass it has been the practice to form the pattern on the upper surface of the sheet, and there is always great liability of the pattern being indistinct or distorted in consequence of the short time the roller is in contact with the glass.

The object of this invention is to provide machinery whereby sheets of glass can be more easily and economically rolled with a pattern or figure and whereby the pattern or figure is formed more clear and distinct and is less liable to be distorted, and also whereby the sheets of glass when rolled can be readily inserted into the annealing-kiln without risk of being crumpled or distorted or fractured.

Referring to Figs. 1 and 2, in carrying my invention into practice according to this arrangement I provide a pair of rollers 2 3. The lower one 3 is carried in bearings in a frame 4, provided with wheels 5 on shafts 6, and free to run to and fro on guides or rails 7, supported on standards 8 or otherwise, as desired. The rollers are preferably geared together by toothed wheels 9 10 and can be caused to rotate by any convenient gearing, such as by toothed wheels 11 on a shaft 12, carried in the frame 4.

13 is a spur-wheel on the shaft 12, operated by pinion 14 on a shaft 15. The shaft 15 may be operated by hand or any convenient power, such as an electric motor, if desired. The lower one 3 of the pair of rollers carries the pattern which is to be impressed on the glass. The upper one 2 of the pair of rollers is carried in bearings in a movable frame 16, pivoted at 17 on the shaft of the roller 3, so that such roller 2 can be moved concentrically about the lower one 3 from or into the position shown by the dotted lines 16ª.

18 is a chain attached at one end to the frame 16 and passing over a pulley 19 on the shaft 20, supported by the frame 4. The chain is attached at the other end to the barrel 21 on a shaft 22. The shaft 22 can be rotated by the handle 23, so as to wind up the chain and raise the frame 16 into the position 16ª.

24 is a ratchet-wheel on the shaft 22, and 25 is a pawl for holding the shaft 22 stationary when the movable frame 16 has been raised. Any other convenient means for raising the frame 16 can be used, if desired.

26 represents guide-plates for feeding the molten glass between the pair of rollers. These guide-plates are secured to the movable frame 16 by bars 27, so that they move therewith.

28 is a guide or directing plate for directing the rolled sheet of glass from the roller 3. This guide or directing plate 28 is secured to the frame 4 in any desired way and in such position that the glass can follow the lower roller for some distance before reaching such plate.

29 represents chain-wheels on the shaft 6 of the wheels 5.

30 represents pitch-chains passing around the chain-wheels 29 and around chain-wheels 31 on the shaft 12. By means of these chains and chain-wheels when the roller 3 is rotated by the shaft 12 the wheels 5 are also rotated and carry the frame 4 and all the apparatus supported thereby along the rails 7.

At the commencement of rolling the sheet the roller 2 is preferably lowered to the position shown by the solid lines—that is, nearly level with the center of the lower roller 3. The molten glass is placed between the guide-plates 26, as shown at 32. The roller 2 is then raised by means of the chain 18 into the position 16ª, thus forming the first portion of the sheet against the roller 3. The roller 3 is then rotated by its gearing in the direction shown by the arrow, and the sheet of glass thus formed is directed down the guide or directing plate 28, and as the frame 4 travels along the rails 7 in the direction shown by the arrow at 33 such sheet of glass 32ª is laid on the table 34. The dotted lines 4ª show the position of the frame 4 when it has reached the end of its travel and the completed sheet 32ª is laid on the table 34. When the sheet is being thus rolled, the glass follows the contour of the lower pattern-roller for some distance before it reaches the directing-plate 28, and thereby becomes so much cooled that the pattern formed on the glass is not afterward liable to become indistinct or the sheet distorted. In some cases the frame 16 may be dispensed with, the roller 2 being stationary at the position 16ª and carried in bearings in the frame 4. The table or plate 34 is arranged beneath the rails 7 and is mounted on a pillar 35, so that it can be swiveled in any direction, so as to present the end of the sheet of glass laid thereon to the mouth of the annealing-kiln. The dotted lines 34ª show the table swiveled around at right angles to its normal position, so as to present the hotter end of the sheet—that is, the end which last left the rollers—to the mouth of the annealing-kiln 36, into which it is pushed by a pusher 37 or other glass-moving device acting against the cooler end of the sheet. By using the pusher at the cooler end of the sheet there is much less liability of the sheet becoming distorted or fractured by the strain necessary to push the sheet into the kiln, as the cooler end of the sheet is much stiffer than the other end and can withstand the necessary strain of the pusher. When the pusher is used at the hotter end of the sheet, there is great liability of the sheet being distorted, owing to its softness.

Referring to Figs. 3 and 4, in this modification the roller 2 in its frame 16 and the roller 3 are carried in a stationary frame 38, and the table 34 is mounted on a carriage 39, carried by wheels 40, free to run along rails 41. The toothed wheels 11 on the shaft 12, besides turning the roller 3, also gear into the racks 42 on the table 34, so as to draw the table along. As the rollers 2 and 3 rotate, the sheet of glass is formed and directed down the guide-plate 28 onto the table 34. When the table has passed under the rollers and received the complete sheet, it can be swiveled around for the sheet to be pushed into the annealing-kiln, as before described.

I do not confine myself to the above-described arrangements of parts, as many variations may be made without departing from the essential features of my invention; but

What I claim as my invention, and desire to secure by Letters Patent, is—

1. Apparatus for rolling patterned glass comprising a roller having a patterned face, another roller movable concentrically about the pattern-roller, a hopper for directing molten glass between said rollers, and a guide-plate arranged to direct the formed sheet; substantially as described.

2. Apparatus for rolling patterned glass, comprising upper and lower rollers, and guide-plates for molten glass, the lower roller having a pattern and being arranged to allow the sheet of glass to follow the contour of such pattern-roller, the upper roller and the guide-plates being movable concentrically about the lower roller; substantially as described.

3. Apparatus for rolling patterned glass, comprising a frame having rollers therein, at least one of which is patterned, a hopper arranged to direct molten glass between the rollers, a swiveled table arranged to receive the sheet, and mechanism for moving the frame and table relatively to each other, and simultaneously rotating the rollers; substantially as described.

4. Apparatus for rolling patterned glass, comprising a lower roller having a pattern, an upper roller, and a hopper, both movable concentrically about the lower roller, and mechanism for moving the roller and hopper and retaining them in place; substantially as described.

WILLIAM WINDLE PILKINGTON.

Witnesses:
JOHN HAROLD DICKINSON.
JAMES BARRON.